United States Patent [19]
Neff

[11] 4,294,073
[45] Oct. 13, 1981

[54] INTEGRAL TURBINE HOUSING AND EXHAUST COLLECTOR SECTION

[75] Inventor: Joseph J. Neff, Zionsville, Ind.

[73] Assignee: Cummins Engine Company, Inc., Columbus, Ind.

[21] Appl. No.: 82,284

[22] Filed: Oct. 5, 1979

[51] Int. Cl.³ ............................................. F02B 37/00
[52] U.S. Cl. ...................................... 60/597; 415/205
[58] Field of Search ................. 60/597, 598, 602, 605; 415/205

[56] References Cited

U.S. PATENT DOCUMENTS

| | | | |
|---|---|---|---|
| 1,921,907 | 8/1933 | Buchi | 60/605 |
| 3,383,092 | 5/1968 | Cazier | 60/605 X |
| 3,557,549 | 1/1971 | Webster | 60/602 X |
| 3,591,959 | 7/1971 | Kubis | 60/605 |
| 3,948,052 | 4/1976 | Merkle et al. | 60/605 |
| 4,111,598 | 9/1978 | Kasuya | 60/605 X |

FOREIGN PATENT DOCUMENTS

| | | | |
|---|---|---|---|
| 352912 | 1/1930 | United Kingdom | 60/605 |
| 503003 | 3/1939 | United Kingdom | 60/605 |

*Primary Examiner*—Michael Koczo, Jr.
*Attorney, Agent, or Firm*—Sixbey, Friedman & Leedom

[57] ABSTRACT

An integral turbine housing and exhaust collector section (44) is disclosed for use in an internal combustion engine turbocharger wherein the integral housing and collector section (44) is characterized by lighter weight, smaller size and greater efficiency than designs known heretofor. In the preferred embodiment, the turbine housing includes a volute section (46) containing twin 360° volute passages (58, 60) into which a pair of parallel exhaust gas streams (34, 36) are directed by a pair of mirror image legs (48, 50) shaped to receive exhaust gases traveling in opposite direction toward the midsection of the engine (25) from a multi branch exhaust manifold (82, 84). Each leg (48, 50) contains a guide passage (81) having a curved central axis ($1_4$) characterized by a constant radius of curvature ($R_1$) at each point along the axis ($1_4$) to provide the most aerodynamically efficient path of travel for each exhaust gas stream (34, 36).

20 Claims, 10 Drawing Figures

INTEGRAL TURBINE HOUSING AND EXHAUST COLLECTOR SECTION

DESCRIPTION

1. Technical Field

This invention relates to a turbine housing and exhaust collector assembly designed for use on an internal combustion engine wherein the turbine is driven by the exhaust gases from the engine.

2. Background Art

The benefits derived from the use of exhaust driven turbochargers to pressurize the intake manifold of an internal combustion engine have long been recognized by engine designers. Such benefits have spurred extensive research and development into turbine housing designs for the purpose of optimizing the power output and minimizing the cost, size and weight of the turbine component of the turbocharger.

Early turbine designs, such as disclosed in U.S. Pat. No. 1,921,907 to Buchi normally included a stationary nozzle ring located around the periphery of the turbine wheel, the purpose of which was to increase the speed of the fluid prior to its introduction to the turbine wheel and to direct the fluid toward the wheel at the proper angle of approach. More recent turbine designs have tended to eliminate the stationary nozzle ring in favor of appropriately shaped turbine volute passages designed to achieve proper exhaust gas distribution and entry direction around the turbine wheel while leaving the flow passage into the turbine wheel essentially unobstructed.

As the output requirement of the internal combustion engine is increased, it becomes advantageous to use a divided exhaust manifold system in which exhaust gases from the various cylinders are ducted through one of several separate branches, the arrangement desirably being such that exhaust gases are alternately fed through the branches, e.g., in a 6-cylinder engine having a firing order 1-5-3-6-2-4 exhaust, gases from cylinders 1, 2 and 3 may be ducted through one branch and exhaust gases from cylinders 4, 5 and 6 ducted through another branch. The advantage of using separate branches for the exhaust gases is that the static pressure in each branch is allowed to fall to a low value between each exhaust pulse through that branch thereby lowering the pumping loss of the engine. Typically, the turbine inlet is positioned adjacent the midsection of the exhaust manifold with the exhaust manifold being formed of separate forward and rearward branches. Such an arrangement is almost always employed when the turbine is of the type including two separate volute passages used to introduce intermittent or pulsating exhaust gases from a branched maifold to successive 180° sections of the turbine wheel periphery. Known as a "double flow" turbine housing, this arrangement operates on alternate pulses being fed to opposite sides of the turbine wheel, resulting in efficiency losses associated with partial admission operation of the turbine, and also resulting in bearing system difficulties caused by alternating lateral forces being applied to opposite sides of the turbine wheel. The turbine disclosed in the above noted Buchi reference appears to be of this "double flow" type.

In order to overcome the difficulties associated with "double flow" housings, the turbine volute may be shaped to contain two, side-by-side passages each receiving exhaust gases from one of the two branches and each feeding approximately 360° of the turbine wheel periphery. This arrangement of the turbine housing retains the advantages of maintaining substantial isolation between the forward and rearward exhaust manifold branches and simultaneously overcomes the problems associated with "double flow" turbines by introducing the exhaust gas stream from each branch separately around substantially the entire periphery of the turbine wheel. To maintain symmetry in the exhaust passages of a "twin flow" turbine mounted centrally of an engine, it is necessary to bend the flow from the forward and rearward exhaust manifold branches 90° to form a pair of parallel streams moving generally perpendicularly with respect to the longitudinal axis of the forward and rearward exhaust manifold branches. Designing an exhaust manifold functioning in this manner is not a trivial engineering task. For example, the manifold may not be formed in a single integral piece, since most practical engines, particularly in-line six cylinder engines, require an exhaust manifold which, if cast in a single piece, would create formidable molding and tolerance problems leading to excessive handling and reject expenses. On the other hand, an exhaust manifold formed in too many sections would require an excessive number of connecting joints. Additional joints inherently increase flow losses by introducing discontinuities within the flow passages due to the impossibility of precisely aligning the open ends of successive sections of the manifold.

In one class of engines, namely in-line 6 cylinder engines, a commonly employed, compromise solution to the problem discussed above is to form the exhaust manifold in three sections. Such a manifold includes a forward branch connected with the two foward most engine exhaust ports, a rearward branch connected with the two rearward most exhaust ports and a central collector section connected to the two remaining engines exhaust ports. Engines embodying such designs are presently manufactured and sold by Cummins Engine Company, Inc., Columbus, Ind., assignee of the subject invention identified as Formula 230, Formula 250, NTC 290, and KT-1150-6. The central section typically contains a first passage having an inlet connected by a gas tight joint to the forward branch and a second passage having an inlet connected by another gas tight seal to the rearward branch. The first and second passages both bend 90° and terminate at separate coplanar outlet ports surrounded by a single connecting flange adapted to be attached to a similarly shaped connecting flange formed on the turbine housing and containing a pair of correspondingly shaped inlet ports communicating with the dual, side-by-side passages of a "twin flow" turbine housing. U.S. Pat. No. 3,557,549 to Webster discloses a turbocharger and exhaust manifold assembly including a center section of this type.

While enjoying many advantages, the typical three section exhaust manifold and turbine assembly suffers some major inherent defects. For example, significant weight is added to the exhaust manifold and turbine assembly by use of flanges for connecting the turbine housing to the central manifold section. Such flanges necessitate a gasket seal and connecting bolts which require expensive boring and threading operations. To avoid the necessity of forming two separate connecting flanges on the central section, the first and second passages are formed in a shape which is less than ideal from an aerodynamic point of view. Moreover the transition from exhaust manifold to turbine volute, as well as the blend in cross-sectional shape of the exhaust manifold to turbine volute must be compromised from the ideal in order to accommodate the single connecting flange.

Attempts have been made in the past to integrate portions of the turbocharger housing with the engine manifold such as illustrated in U.S. Pat. No. 3,673,798 and U.S. Pat. No. 3,948,052. However, these attempts have generally resulted in integral units having excessive complexity and weight and have not suggested a practical solution to the problems associated with turbocharger and exhaust manifold assemblies for in-line engines.

DISCLOSURE OF THE INVENTION

A primary object of this invention is to overcome the disadvantages of the prior art as discussed above, and specifically, to provide an integral turbine housing and exhaust collector section which is lighter weight, reduced in size, and more efficient than the multi-part structure known heretofore.

A more particular object of this invention is to provide an integral turbine housing and exhaust collector section which eliminates the conventional flange, gasket and attachment bolts previously employed in multi-part structures known heretofore.

Still another object of this invention is to provide an integral turbine housing and exhaust collector section which achieves better aerodynamic blend between the turbine volute and the exhaust manifold than could be achieved by prior art devices.

Another object of this invention is to provide an integral turbine housing and exhaust collector section having a smaller overall size and weight for a given capacity exhaust turbine by utilization of a shorter axial transition between the turbine volute and exhaust collector sections as compared with previously known systems.

A more specific object of this invention is to provide a "twin-flow" turbine housing for use on a multi-cylinder internal combustion engine including a volute section and a combined exhaust collecting means and exhaust stream guide means wherein the exhaust collecting means receives exhaust gases from forward and rearward branches of a multi-branch exhaust manifold and the exhaust stream guide means, integrally formed with the volute section, directs exhaust gases from the forward and rearward branches along a pair of aerodynamically efficient paths having central axes which are smoothly curved at each point along their axial lengths.

A still more specific object of the subject invention is to provide a turbine housing for use in an internal combustion engine turbocharger including a volute section and an integral exhaust gas collector section for use in combination with an internal combustion engine having a multi-branch exhaust manifold including rearward and forward branches whose central axes are coaxially aligned wherein the volute section is formed to receive a turbine wheel rotatable about an axis parallel to the aligned branch axes and is integrally formed with the collector section such that the point of commencement of the volute section is sufficiently close to the aligned branch axes to cause a plane, which intersects the aligned branch axes and which is parallel to a plane passing through the rotational axis of the turbine wheel and the commencement point of the turbine section volute, to intersect the volute section.

Other and more specific objects of this invention can be appreciated by consideration of the following Brief Description of Drawings and the following description of Best Mode for Carrying Out the Invention.

BEST MODE FOR CARRYING OUT THE INVENTION

Figures 1, 2, 3:
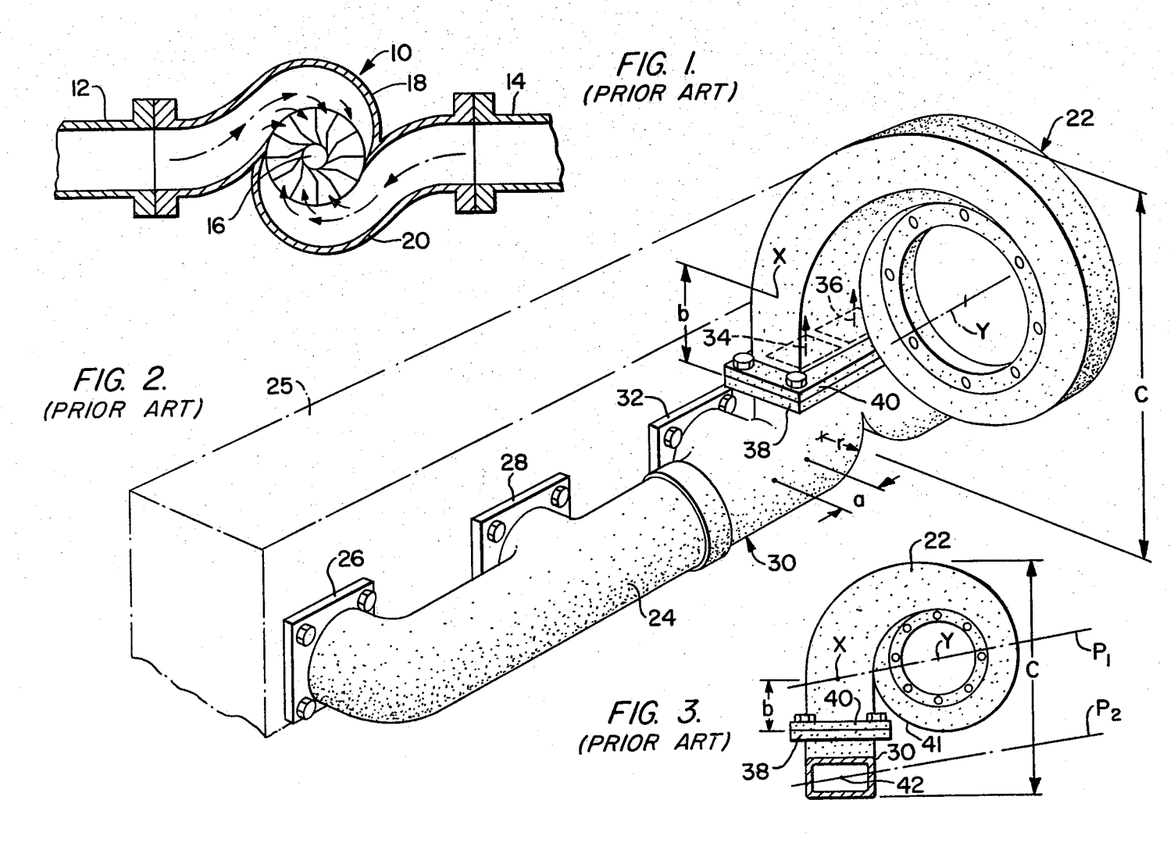
FIG. 1 is a cross-sectional view of a prior art turbine housing and exhaust manifold assembly wherein the turbine is of the "double-flow" type.
FIG. 2 is a cut-away perspective view of a prior art turbine housing and a multi-branched manifold assembly wherein the turbine is of the "twin-flow" type.
FIG. 3 is a side view of the "twin-flow" turbine housing and manifold assembly illustrated in FIG. 2.

In order to understand the significant benefits achieved by the subject invention, it is desirable first to consider typical prior art turbine housing and exhaust manifold assemblies as illustrated in FIGS. 1-3. In FIG. 1, a cross sectional view of a "double-flow" turbine 10 is illustrated in combination with a forward branch 12 (partially illustrated) and rearward branch 14 (partially illustrated) of a multi-branch exhaust manifold of an internal combustion engine. As discussed above, and as illustrated in FIG. 1, a "double-flow" turbine is designed to supply the motive fluid, in this case exhaust gases from the internal combustion engine, in two streams to the turbine wheel 16 mounted for rotation within a pair of volute sections 18 and 20. Each volute section is arranged to supply one of the exhaust gas streams to approximately 180 degrees of the turbine wheel 16. Obviously, a turbine of the "double-flow" type is ideally suited for mounting adjacent the midsection of an internal combustion engine since exhaust gases generated in the forward portion of the engine may be supplied to one turbine volute while the exhaust gases generated in the rearward section of the engine may be supplied to the other turbine volute without requiring substantial change in the direction of exhaust gas flow from the forward and rearward engine sections.

Despite the advantages of a simplified flow ducting arrangement, "double-flow" turbines suffer numerous disadvantages some of which are discussed above regarding efficiency losses due to partial admission and also bearing system difficulties caused by alternating lateral forces being applied to opposite sides of the turbine wheel.

A more efficient type of turbine design is illustrated in FIG. 2 including a "twin-flow" turbine 22 containing a pair of side-by-side volute passages arranged to supply exhaust gases substantially 360° around the periphery of the turbine wheel, not illustrated. For the type of turbine housing illustrated in FIG. 2, the volute section may be considered as that portion of the housing containing the volute passages defined, in part, by an outer wall which, in cross section taken perpendicular to the rotational axis of the turbine wheel defines a curved path, each point of which is at a radial distance from the rotational axis of the turbine wheel which gradually decreases in the direction of exhaust flow through the volute passages. The commencement point of the volute section of turbine 22 can be visualized as a plane passing through point x which plane is perpendicular to the flow of gases entering the volute passages.

Because the flow of gases through the volute passages must be substantially parallel, the most efficient manner of mounting a "twin-flow" turbine adjacent the mid section of an internal combustion engine 25 (illustrated partially in dashed lines) provided with forward and rearward exhaust gas manifold branches (only forward branch 24 appears in FIG. 2) is to arrange the rotational axis of the turbine wheel parallel to the longitudinal axis of the forward and rearward exhaust gas manifold branches. The forward exhaust manifold branch 24 is illustrated as being connected to a pair of forward engine exhaust ports (not illustrated) by means of exhaust port flanges 26 and 28. The rearward exhaust branch, not illustrated, is similar in design to the branch 24 and is connected with a pair of rearward exhaust ports in a position wherein the longitudinal axes of the forward and rearward branches are coaxial. This arrangement is possible in an engine block/head assembly wherein the engine cylinders are generally in-line and the exhaust ports are arranged substantially in alignment from the forward and rearward section of the engine. When designed in this way, the forward exhaust branch collects exhaust gases from the forward exhaust ports and directs such exhaust gases generally rearwardly of the engine assembly. In a similar fashion, the rearward exhaust branch directs exhaust gases received from the rearward exhaust ports in a direction generally forwardly of the engine assembly.

Since most practical in-line engines of four or more cylinders are generally of a length which makes impractical the casting of a single integral exhaust manifold, it has generally been found desirable to form the exhaust manifold in a multi-branch configuration, which, in the case of an in-line 6 cylinder engine, is generally formed of three separate sections. This is illustrated in FIG. 2 wherein the forward exhaust branch terminates short of a pair of centrally located exhaust ports, not illustrated. A central exhaust manifold section 30 functions to collect the exhaust gases from the forward exhaust branch 24 and one of the centrally located exhaust ports (to which the central exhaust manifold section 30 is connected by exhaust port flange 32) to form a first exhaust gas stream 34 for introduction into one of the volute passages of turbine 22. A separate portion of the central exhaust collector section 30 similarly collects the exhaust gases from the rearward exhaust branch, not illustrated, and a second centrally located exhaust port to form a second exhaust gas stream 36 for introduction into the second volute passage of turbine 22.

Because exhaust gas streams 34 and 36 must be substantially parallel at the point of commencement of the turbine volute section, (illustrated at point x) the exhaust collector section 30 must be shaped to turn each of the exhaust streams formed by the forward and rearward portions of the collector section 30 90° with respect to the longitudinal axes of the forward and rearward exhaust branches. When the turbine housing 22 and the central exhaust collector section 30 are formed separately, as is conventional, the joint therebetween is generally formed by a pair of flat rectangular flanges 38 and 40 integrally formed, respectively, with the central exhaust collector section 30 and the turbine 22. Gas flow ports formed in flanges 38 and 40 are positioned for substantial alignment when flanges 38 and 40 are bolted together to thus allow the exhaust gas streams 34 and 36 to pass from the exhaust gas collector 30 into the turbine housing 22. The rather high temperatures and pressures obtained during certain stages of engine operation as well as the weight of the housing 22 require flanges 38 and 40 to be formed with substantial strength, thus requiring relatively large dimensions in length, width and thickness as compared with the overall size of the turbine housing and exhaust manifold. In addition to the cost of forming flanges and the attendant connecting bolts, certain design constraints are imposed by the configuration of the turbine/manifold assembly illustrated in FIG. 2 which are not immediately apparent. In particular, the size of flanges 40 imposes certain restraints upon the position at which the volute section of the turbine housing may be positioned. In particular, as illustrated in FIGS. 2 and 3, the commencement point x of the turbine volute must of necessity be placed a significant distance b in the downstream direction from the point of joinder of flanges 38 and 40 in order to insure that the outer most surface 41 of the volute section remains clear of the flange 40 formed integrally on the turbine housing. This distance b can add significantly to the overall size c of the manifold/turbine assembly as measured in the direction of the exhaust gas streams as they enter the commencement point of the volute passages. To prevent excessive overall size, it is common practice to limit the radius r of curvature of that portion of the central exhaust collector section 30 which actually causes the exhaust gas stream to bend 90° from the axial direction of each of the exhaust manifold branches. In so limiting the radius of curvature of this portion of the central exhaust collector section 30, a portion of the travel of the exhaust gas streams within the central exhaust collector section may be linear in nature in the area generally indicated by the letter a in FIG. 2. Because of the requirements and constraints imposed by flanges 38 and 40, a first plane which passes through the axially aligned central axes 42 of the forward and rearward exhaust branches and which is parallel to a second plane, which passes through the rotational axis y of the tubine wheel (not illustrated) and the point x of commencement of the turbine volute, will not intersect the housing of turbine 22. The first and second planes may be visualized as two parallel planes passing perpendicularly through the plane of the sheet of FIG. 3 and intersecting therewith along lines $l_1$ and $l_2$.

Figure 4:
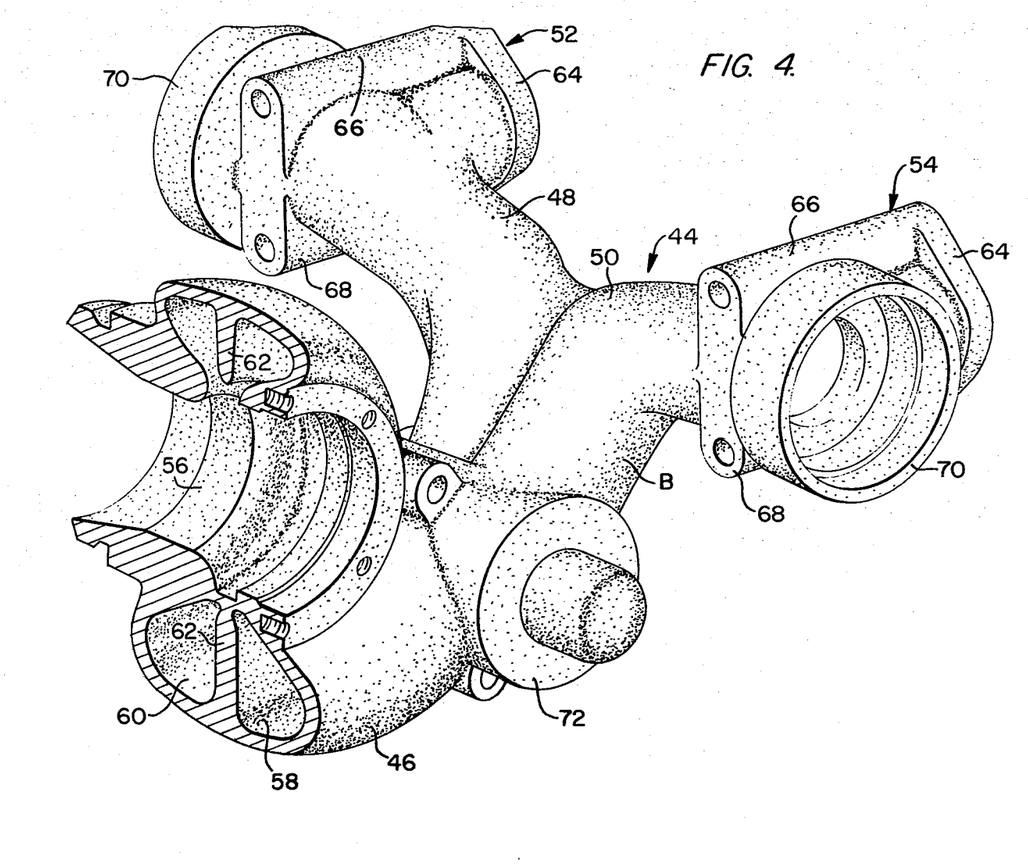
FIG. 4 is a partially cut-away perspective view of the integral turbine housing and exhaust collector section designed in accordance with the preferred embodiment of the subject invention.

Attention is now directed to FIG. 4 in which a preferred embodiment of the subject invention is illustrated in perspective view. In particular, FIG. 4 illustrates an integral turbine housing and exhaust collector section 44 including a volute section 46, illustrated as partially cut-away, and a pair of legs 48 and 50 which together formed exhaust stream guide means integrally connected with the volute section 46. Each leg 48 and 50 terminates in a section (52 and 54, respectively) for collecting and forming first and second exhaust gas streams from at least one internal combustion engine exhaust port and an exhaust manifold branch (not illustrated). As will be explained more fully below, the first and second exhaust gas streams formed by sections 52 and 54 are directed into the volute passages of the volute section 46 in a highly efficient manner by means of structure which actually reduces the overall size of the manifold turbine assembly which incorporates the subject invention.

As illustrated in FIG. 4, the volute section 46 includes a central opening 56 shaped to receive a turbine wheel, not illustrated, having a rotational axis coincident with the central axis of the central opening. The volute section 46 is positioned to cause the central axis of opening 56 to be generally parallel to the central axes of the forward and rearward exhaust manifold branches to which the subject integral housing and exhaust collector section 44 is adapted to be attached. A pair of substantially isolated, side-by-side volute passages 58 and 60 are contained in volute section 46, each volute passage has a cross-sectional shape taken along a plane perpendicular to the central axis of opening 56 which forms a curved path having a maximum radial distance from the central axis of opening 56 at the point of commencement of the volute passages illustrated by point B and further characterized by a continually decreasing radial distance from the central axis of opening 56 in the direction of gas flow within the volute passages. The interior walls of the volute passages, in cross-section, may be pictured as a pair of spiral paths which intersect with the opening 56 at a common point with the outer spiral path making one additional turn about the opening before intersecting with the inner spiral path. As is characteristic of "twin-flow" turbines the volute passages 58 and 60 are maintained in a substantially separated condition by means of a dividing wall 62 which is initially closed around the perimeter of the opening 56 but which subsequently opens into the opening 56 to cause exhaust gases moving through the volute sections to enter the turbine wheel and cause rotational movement thereof. While the output shaft of the turbine may be used to provide rotational force for any useful purpose, it will generally be connected to drive a compressor for pressurizing the intake manifold of the internal combustion engine thereby forming a turbocharger assembly.

Each section 52 and 54 includes an exhaust port flange 64 for bolted connection to that portion of the cylinder/block assembly of the internal combustion engine, not illustrated, which surrounds the central exhaust ports designed to supply exhaust gases directly to the integral turbine housing and collector section illustrated in FIG. 4. The flanges 64 are illustrated as being integrally formed in combination with bolt receiving bosses 66 and 68 which provide a means for mounting the integral turbine housing and exhaust manifold section to the internal combustion engine simultaneously with forming a gas tight seal around the corresponding centrally located exhaust ports. Each section 52 and 54 includes a generally cup shaped connecting element 70 which forms a joinder means for connection with the terminal ends of the forward and rearward branches respectively to receive the exhaust gases from the corresponding branches for subsequent joinder with the exhaust gases received through exhaust port flanges 64. As will be described in greater detail hereinbelow, the integral turbine housing and exhaust collector section 44 may include an integrally formed exhaust brake housing 72 internally of which may be mounted a valve element, not illustrated, for selectively blocking the flow of exhaust gases within the exhaust gas manifold of which the subject integral turbine housing and exhaust collector section 44 is a portion.

Elimination of the connecting flanges between the conventional turbine housing and exhaust collector section has the unobvious advantage of not only reducing weight and cost but also of increasing potential efficiency by permitting redesign of the exhaust stream passages as can be more easily understood by reference to FIGS. 5-10. In particular, FIG. 5 discloses a side elevational view of the integral housing and exhaust section 44 of FIG. 4 wherein the volute section 46 is shown as having a commencement point generally located at point B. The commencement point may also be visualized as a plane which passes through point B perpendicularly with respect to the central axis of the gas stream entering the volute section 46. This point within a turbine housing can always be determined by the point at which the interior surfaces forming the volute passages intersect a plane passing perpendicularly through the rotational axis of the turbine wheel 74 (illustrated in dashed lines) to form a pair of smooth curved paths 76 and 78 wherein each path is defined by a locus of points spaced from the rotational axis of turbine wheel 74 by a distance which is continuously decreasing in the direction of fluid flow through the respective volute passages.

Figures 5, 6, 10:
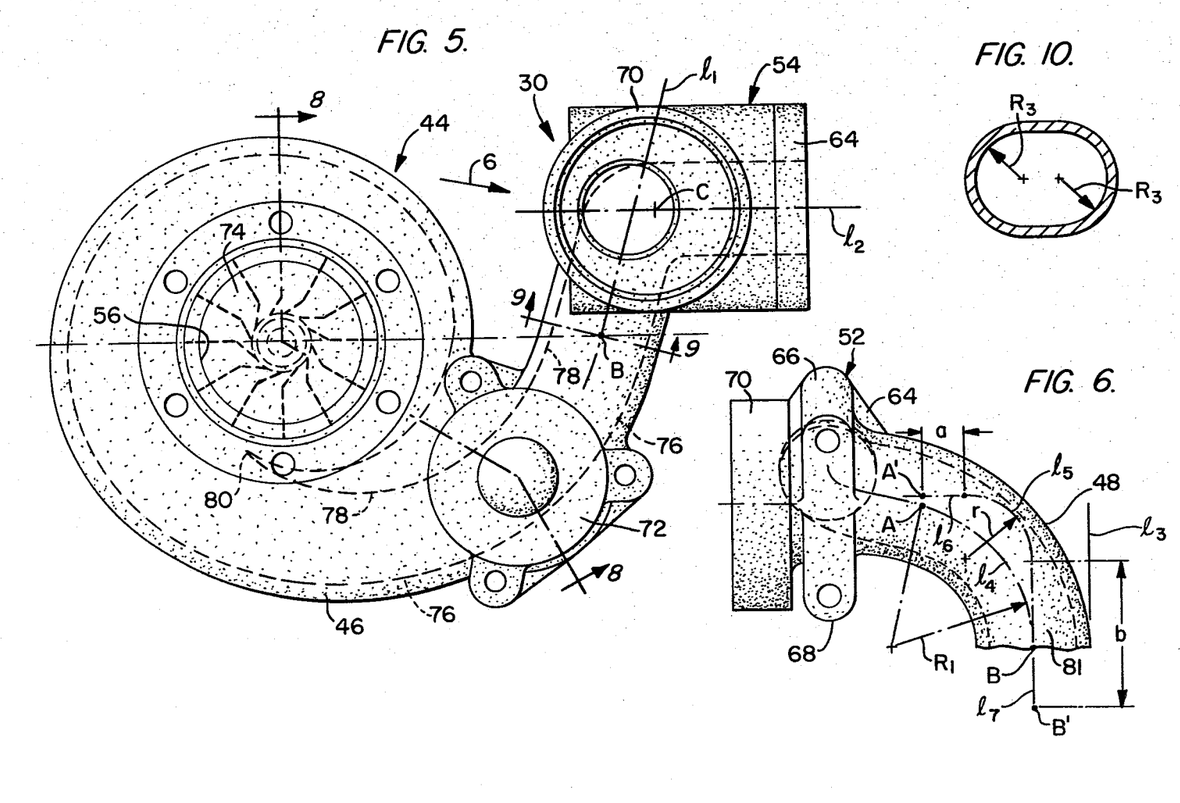
FIG. 5 is a side elevational view of the integral turbine housing and exhaust collector section illustrated in FIG. 4.
FIG. 6 is a partially cut-away elevational view of one leg extension of the volute section constituting a portion of the exhaust collecting means and the exhaust stream guide means of the subject invention taken in the direction of arrow 6 of FIG. 5.
FIG. 10 is a cross-sectional view of the collection passages formed in one leg of the exhaust collecting means taken along lines 10—10 of FIG. 7.

As can be very easily seen in FIG. 5, line 76 intersects with line 78 at point 80 after traveling one full revolution around the rotational axis of wheel 74 in addition to the distance traveled by line 78. It is at point 80 that the volute passages open into the central opening 56 of the turbine and cause the gases contained therewithin to be introduced into the turbine wheel 74. As will be explained in greater detail hereinbelow, formation of the turbine volute integrally with the central exhaust collector section permits a substantial reduction in the total axial length required for passage of the exhaust gases from the terminal ends of each forward and rearward manifold branches to the commencement point of the respective volute passages.

The 90° curved path over which the exhaust gases from the terminal ends of each exhaust manifold branch must pass before entering the volute section of the turbine housing occurs primarily in a single plane perpendicular with the plane of the view illustrated in FIG. 5 and intersecting therewith along a line $l_1$. The exhaust collected by section 54 through exhaust port flange 64 is subjected to an additional 90° bend before it joins with the exhaust received from the manifold branch connecting with cup-shaped connecting element 70. This additional 90° bend in the exhaust gas flow stream passes perpendicularly through the plane of the view illustrated in FIG. 5 and depicted by line $l_2$. While line $l_2$ passes through the coaxially aligned central axes of the rearward and forward exhaust manifold branches, which axes are depicted by point C in FIG. 5, the plane depicted by $l_1$ passes slightly to the left of such coaxially aligned axes.

To understand more clearly the advantages of the subject invention, attention is further directed to FIG. 6 which is in an elevational view of leg 48 of the combined exhaust collector section. As can be easily appreciated from consideration of FIG. 4, leg 50 if included in FIG. 6 would form an exact mirror image of leg 48 taken along line $l_3$. As can be seen quite clearly in FIG. 6, leg 48 includes a guide passage 81 having a central axis extending from a point A to a point B along a curved path having a radius of curvature of $R_1$. Accordingly, exhaust gases received from an exhaust gas manifold through cup-shaped connecting element 70 advances substantially linearly toward A while simultaneously joining exhaust gases received through exhaust port flange 64 and then passes through guide passage 81 formed in leg 48 which extends from point A to point B.

To understand the advantages of this invention when compared to the structure known in the prior art, the path which would be followed by exhaust gases utilizing the multi-part turbine housing and exhaust collector designs of the prior art is illustrated by a dashed line $l_5$ shown as extending from point A' generally adjacent point A to point B' by first extending along a short linear section $l_6$ around a 90° curve having a radius significantly smaller in size than radius $R_1$ and continuing along a linear path represented by line $l_7$. Line $l_6$ corresponds in length to the distance a as illustrated in FIG. 2 depicting the prior art as discussed above. Similarly, line $l_7$ has a length corresponding to distance b also depicted in FIG. 2 discussed above with reference to the prior art. As can now be clearly seen in FIG. 6, the path over which the exhaust gases travel in leg 48 from the terminal section 52 to the point of commencement of the turbine volute B is not only considerably shorter but also follows a more gradually curved path to thereby increase the aerodynamic efficiency of the overall assembly when the turbine is formed integrally with the exhaust collector section in accordance with the teachings of the subject invention. This aerodynamic efficiency results not only from the more gradual turn in the direction of flow of the combined exhaust gas stream but also by virtue of the reduced total length over which the exhaust gas must travel in moving from point A to point B (represented by the length of line $l_4$) as compared with the path of travel from point A' to point B' (represented by the length of lines $l_6$, $l_5$ and $l_7$). The reduced path of travel between point A and point B additionally enables the overall size of the turbine housing and exhaust collector section of the present invention to be reduced significantly. This reduction in size is graphically depicted by comparing the turbine housing and exhaust collector section illustrated in FIG. 5 with the prior art turbine housing of FIG. 3. As previously mentioned, the requirements and constraints imposed by flanges 38 and 40 in FIG. 3 prevent a plane $p_2$, which passes through the axially aligned central axes 42 of the forward and rearward exhaust branches and which is parallel to a second plane $p_1$ passing through the rotational axis y of the turbine wheel and the point x of commencement of the turbine volute, from intersecting the turbine housing 22. In contrast, the volute section 46 of the present invention as integrally formed with the exhaust collector section 54,56 is sufficiently close to the aligned branch axes of the forward and rearward exhaust branches to cause a plane, which intersects the aligned branch axes along the line $l_2$ illustrated in FIG. 5 and which is parallel to a plane passing through the rotational axis of the turbine wheel and the commencement point B of volute section 46, to intersect the volute section.

Figures 7, 8, 9:
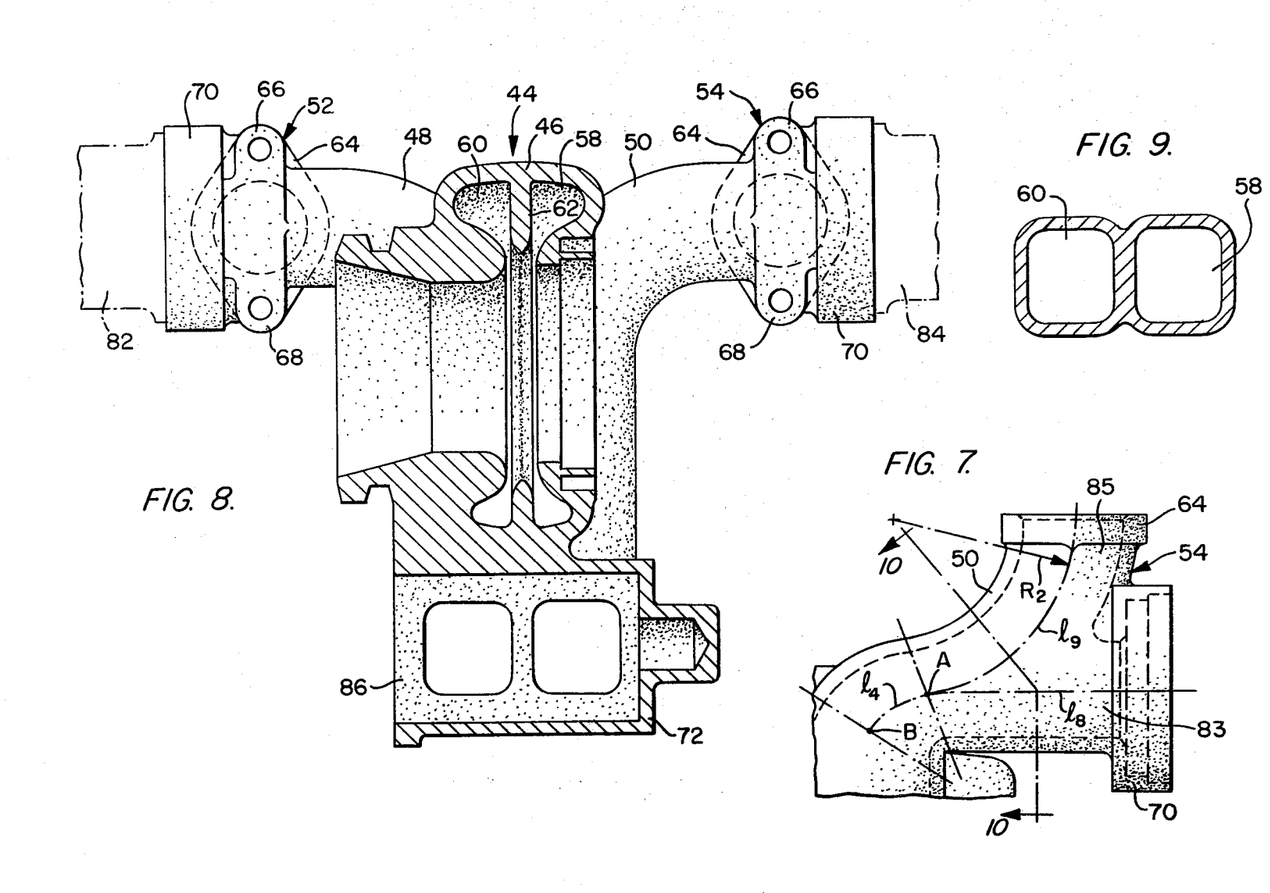
FIG. 7 is a partial top elevational view illustrating another leg section forming a portion of the exhaust collecting means and exhaust stream guide means of the integral turbine housing and exhaust collector section of the subject invention.
FIG. 8 discloses a cross-sectional view of the integral turbine housing and exhaust collector section of the subject invention taken along the lines 8—8 of FIG. 5.
FIG. 9 is a cross-sectional view of the point of joinder of the exhaust stream guide means and the volute section of the integral turbine housing and exhaust collector section of the subject invention taken along lines 9—9 of FIG. 5.

Turning now to FIG. 7 which is a top elevational view of leg 50 (having a shape which is the mirror image of leg 48) illustrating the terminal section 54 in combination with an exhaust bending or guiding portion of leg 50 corresponding to the identical section of leg 48 illustrated in FIG. 6. In particular, terminal section 54 includes cup shaped connecting element 70 forming a joint with the rearward exhaust manifold branch thereby to receive exhaust gases from the exhaust ports located on the rearward portion of the internal combustion engine and direct such gases along a linear path defined by a collection passage 83 having a central axis represented by line $l_8$ generally aligned with the central axis of the rearward exhaust manifold branch FIG. 8 further discloses the curved collection passage 85 through which is received the exhaust gases from the centrally located exhaust port around which exhaust port flange 64 is designed to form a gas tight seal. Collection passage 85 has a central axis following a curved path represented by line $l_9$ having a radius of curvature $R_2$ which is sufficiently large to cause the central axis of passage 85 to intersect generally at point A with the central axis depicted by line $l_8$ of passage 83 through which is received the exhaust gases from the rearward exhaust manifold branch of the internal combustion engine. Point A corresponds to the point A illustrated in FIG. 6. Typical values for $R_1$ and $R_2$ are 63.2 millimeters 79.5 millimeters, respectively, for a collector section having an overall length in the direction of the central axes of the forward and rearward branches of about 285 mm. It should be noted that the interior walls of the passages illustrated in FIGS. 6 and 7, depicted generally by dashed lines, will have a radii of curvature generally coincident with the center of curvature of the central axes of the passageways. However, some deviation may be permitted in order to assure smooth blending of the interior surfaces of the passages from one portion to another within the integral turbine housing and exhaust collector section 44 designed in accordance with the subject invention.

As described above, terminal sections 52 and 54 together form an exhaust collecting means for receiving exhaust gases from the forward branch and from the central exhaust ports to form a first exhaust stream having a central axis passing through a first joinder point (point A FIG. 6) and for receiving exhaust gases from the rearward branch and another one of the central ports to form a second exhaust stream having a central axis passing through a second joinder point (point A FIG. 7). The remaining portions of legs 48 and 50 form together an exhaust stream guide means for directing the first and second exhaust gas streams formed by sections 52 and 54 into, volute passages 58 and 60, respectively, along a pair of aerodynamically efficient paths extending from the joinder points A to the volute commencement points B with each path being smoothly curved at each point along their central axes.

Turning now to FIG. 8, a cross sectional view of the overall turbine housing and exhaust collector section 44 designed in accordance with the subject invention is illustrated wherein those elements described above are identified by identical reference numerals. As illustrated in FIG. 8, the respective cup shaped connecting elements 70 are designed to form gas tight joints with the respective forward and rearward exhaust manifold branches 82 and 84, partially illustrated in dashed lines in FIG. 8. The exhaust brake housing 72 illustrated in cross-section in FIG. 8 includes an exhaust brake valve element 86 arranged to be rotated between a first angular position in which the volute passages 58 and 60 are simultaneously blocked and a second angular position in which the volute passages 58 and 60 are simultaneously opened for exhaust gas passage. The functioning of the exhaust gas brake assembly illustrated in FIG. 8 is more fully described in a co-pending application assigned to the same assignee as the subject invention.

FIG. 9 discloses a cross-sectional view of the exhaust passageways as exit at the point of commencement of the volute passages illustrated in FIG. 5 by point B. Each of the passages is formed in cross-section in a substantially square configuration having a side dimension of 30 to 31 millimeters typically with a rounded corner intersection having a radius of 10 millimeters.

The configuration of the passages as illustrated in FIG. 9 should be contrasted with the configuration of the passages within the terminating section 52 and 54 such as illustrated in FIG. 10. The typical radius $R_3$ as illustrated in this figure is about 20.2 millimeters.

INDUSTRIAL APPLICABILITY

The subject integral turbine housing and exhaust collection section finds primary application as the drive section for a turbocharger designed for operation in combination with an internal combustion engine having a multi-branch exhaust manifold as is typically employed on an in-line engine. A particularly important application of the subject invention is for turbocharged diesel engines. Other and more general applications of the subject invention is for driving the accessories of an internal combustion engine by means of the exhaust gases. In fact, the subject integral housing and exhaust colelctor section may be employed in any system where a pair of gas streams flowing generally coaxially toward one another must be bent 90° for introduction into the volute section of a turbine housing.

Other aspects, objects and advantages of this invention can be obtained from a study of the drawings, the disclosure and the appended claims.

What is claimed is:

1. A turbine housing for use on a multi-cylinder internal combustion engine having plural exhaust ports formed in the engine head/block assembly generally aligned from front to rear and a multi-branch exhaust manifold having a forward branch connected with at least one forward exhaust port for directing exhaust gases generally rearwardly and a rearward branch connected with at least one rearward exhaust port for directing exhaust gases generally forwardly, the rearward and forward branches terminating short of at least a pair of centrally located exhaust ports, wherein said turbine housing comprises:

(a) a volute section containing a central opening for receiving a rotatable turbine wheel having a rotational axis coincident with the central axis of the central opening and parallel to the first and second axis of the forward and rearward branches when the turbine housing is operatively mounted on the internal combustion engine and containing a pair of substantially isolated, side-by-side volute passages communicating with said central opening for receiving exhaust gases supplied by the forward and rearward branches, respectively, and for delivering exhaust gases to the turbine wheel substantially 360° around the periphery thereof, each said volute passage having an outermost wall which intersects a plane perpendicular to the central axis of the central opening to define a curved line beginning at the commencement point of each said volute passage and continuing around said central axis at a radial distance from the central axis of the central opening which continually decreases;

(b) exhaust collecting means for receiving exhaust gases from the forward branch and one of the central exhaust ports to form a first exhaust stream having a central axis passing through a first joinder point and for receiving exhaust gases from the rearward branch and another one of the central ports to form a second exhaust stream having a central axis passing through a second joinder point; and (c) exhaust stream guide means integrally formed with said volute section and said exhaust collecting means for respectively directing said first and second exhaust gas streams into said pair of volute passages along a pair of aerodynamically efficient paths extending from said first and second joinder points to said first and second commencement points, said exhaust stream guide means including first and second guide passages which respectively extend between said first and second joinder points and said first and second commencement points to define said pair of aerodynamically efficient paths, each said guide passage having a central axis curved at each point along the entire length thereof such that said first and second exhaust gas streams upon passing said first and second joinder points move in continuously curving fashion until reaching the turbine wheel.

2. A housing as defined in claim 1, wherein said exhaust stream guide means also includes first and second legs containing said first and second guide passages.

3. A housing as defined in claim 2, wherein said first and second legs include interior surface walls for defining said first and second guide passages, respectively, said interior surface walls being smoothly blended throughout and characterized by the absence of any surface discontinuities.

4. A housing as defined in claim 3, wherein the central axis of each of said first and second guide passages is characterized by a radius of curvature which is substantially constant throughout its axial length.

5. A housing as defined in claim 4, wherein the central axis of said first and second guide passages connects smoothly with the central axes of the volute passageways, respectively.

6. A housing as defined in claim 5, wherein said exhaust collecting means includes mounting means for providing the primary connecting support to the engine head/block assembly for said volute section, exhaust collecting means and exhaust stream guide means, said mounting means including a plurality of mounting flanges for bolted connection with the portions of the head/block assembly surrounding corresponding central exhaust ports, each said flange including a surface arranged to form a gas seal around the periphery of a corresponding central exhaust port.

7. A housing as defined in claim 6, wherein said exhaust collection means includes first and second sections containing at least first and second collection passages extending between a pair of said mounting flanges, respectively, and said first and second joinder points, respectively for guiding the exhaust gas from corresponding central exhaust ports into said first and second exhaust streams, the central axes of said first and second collection passages being smoothly curved at each point along their axial lengths.

8. A housing as defined in claim 7, wherein the radius of curvature of the central axes of said first and second collection passages is substantially constant at each point along its axial length.

9. A housing as defined in claim 8, wherein said first and second sections include first and second branch joinder means, respectively, for connection with the terminal ends of the forward and rearward branches, respectively, and further include third and fourth collection passages extending between said branch joinder means and said first and second joinder points to intersect with said first and second collection passages.

10. A housing as defined in claim 9, wherein the central axis of said third and fourth collection passages are essentially linear at each point throughout the respective axial length thereof, said branch joinder means being formed to cause substantial coaxial alignment of the central axes of the forward and rearward branches with the central axes of said third and fourth collection passages, respectively.

11. A housing as defined in claim 10, wherein the central axes of said first and third collection passages and said first guide passage intersect at said first joinder point and wherein the central axes of said second and fourth collection passages and said second guide passage intersect at said second joinder point.

12. A housing as defined in claim 11, wherein said volute section includes an exhaust brake valve housing and an exhaust brake valve element mounted for movement within said exhaust brake valve housing between a first position in which said first and second volute passages are simultaneously blocked and a second position in which said first and second volute passages are simultaneously open.

13. A housing as defined in claim 5, wherein said exhaust collecting means includes a plurality of flanges for bolted connection with the portions of the head/block assembly surrounding the central exhaust ports, each said flange including a surface arranged to form a gas seal around the periphery of a corresponding central exhaust port.

14. A housing as defined in claim 13, wherein said exhaust collection means includes first and second sections containing at least first and second collection passages extending between a pair of said flanges, respectively, for guiding the exhaust gas from corresponding central exhaust ports into said first and second exhaust streams, the central axes of said first and second collection passages being smoothly curved at each point along their axial length.

15. A housing as defined in claim 13, wherein the radius of curvature of the central axes of said first and second collection passages is substantially constant at each point along its axial length.

16. A housing as defined in claim 15, wherein said first and second sections include first and second branch joinder means, respectively, for connection with the terminal ends of the forward and rearward branches, respectively, and further include third and fourth collection passages extending between said branch joinder means and said first and second joinder points to intersect with said first and second collecting passages.

17. A housing as defined in claim 16, wherein the central axis of said third and fourth collecting passages are essentially linear at each point throughout their respective axial lengths, said branch joinder means being formed to cause substantial coaxial alignment of the central axes of the forward and rearward branches with the central axes of said third and fourth collection passages, respectively.

18. A housing as defined in claim 17, wherein the central axes of said first and third collecting passages and said first guide passage intersect at said first joinder point and wherein the central axes of said second and fourth collection passages and said second guide passage intersect at said second joinder point.

19. A housing as defined in claim 18, wherein said volute section includes an exhaust brake valve housing and an exhaust brake valve element mounted for movement within said exhaust brake valve housing between a first position in which said first and second volute passages are simultaneously blocked and a second position in which said first and second volute passages are simultaneously open.

20. A turbine housing for use on a multi-cylinder internal combustion engine having plural exhaust ports formed in the engine head/block assembly generally aligned from front to rear and a multi-branch exhaust manifold having a forward branch connected with at least one forward exhaust port for directing exhaust gases generally rearwardly along a first axis and a rearward branch connected with at least one rearward exhaust port for directing exhaust gases generally forwardly along a second axis aligned generally with said first axis, the rearward and forward branches terminating short of at least a pair of centrally located exhaust ports, wherein said turbine housing comprises:

(a) a volute section containing a central opening for receiving a rotatable turbine wheel having a rotational axis coincident with the central axis of the central opening and parallel to the first and second axis of the forward and rearward branches when the turbine housing is operatively mounted on the internal combustion engine and containing a pair of substantially isolated, side-by-side volute passages communicating with said central opening for receiving exhaust gases supplied by the forward and rearward branches, respectively, and for delivering exhaust gases to the turbine wheel substantially 360° around the periphery thereof, each said volute passage having an outermost wall which intersects a plane perpendicular to the central axis of the central opening to form a curved line beginning at the commencement point of each volute passage and continuing around said central axis at a radial distance which continually decreases from the central axis of the central opening; and (b) exhaust collecting means for receiving exhaust gases from the forward branch and one of the central exhaust ports to form a first exhaust stream having a central axis passing through a first joinder point and for receiving exhaust gases from the rearward branch and another one of the central ports to form a second exhaust stream having a central axis passing through a second joinder point; and (c) exhaust stream guide means integrally formed with said volute section and said exhaust collecting means for directing said first and second exhaust gas streams into said pair of volute passages, respectively, along a pair of short length paths extending from said first and second joinder points to said first and second commencement points, said exhaust streams entering said side-by-side volute passages along substantially parallel paths, said commencement points being sufficiently close to the first and second axes of the forward and rearward branches that a plane, which passes through the first and second axes and is parallel to a plane passing through said commencement points and the central axis of said central opening when the turbine housing is operatively associated with the internal combustion engine, will intersect said volute section.

* * * * *